United States Patent [19]

Chabin

[11] 4,243,485
[45] Jan. 6, 1981

[54] RECIRCULATING DRAINAGE CHANNEL FOR THE SAFETY CIRCUITS OF A NUCLEAR REACTOR

[75] Inventor: Michel Chabin, Paris, France

[73] Assignee: Societe Franco-Americaine de Constructions Atomiques-Framatome, Paris, France

[21] Appl. No.: 886,915

[22] Filed: Mar. 10, 1978

[51] Int. Cl.³ .................................. G21C 19/20
[52] U.S. Cl. ...................... 176/37; 210/162; 55/484
[58] Field of Search .................. 176/37, 38, 87; 210/153, 154, 155, 162, 322, 391, 407, 409; 55/DIG. 9, 484

[56] References Cited

U.S. PATENT DOCUMENTS

| 629,578 | 7/1899 | Maginn | 210/162 |
|---|---|---|---|
| 3,168,445 | 2/1965 | Ziegler et al. | 176/38 |
| 3,190,448 | 6/1965 | Johston et al. | 210/162 |
| 3,213,016 | 10/1965 | Gowers et al. | 210/497 |
| 4,049,406 | 9/1977 | Rivers | 55/484 |
| 4,056,436 | 11/1977 | Bukrinsky et al. | 176/38 |
| 4,133,660 | 1/1979 | Steiner | 55/484 |
| 4,135,896 | 1/1979 | Parish et al. | 55/484 |

FOREIGN PATENT DOCUMENTS

| 1501340 | 4/1971 | Fed. Rep. of Germany | 176/37 |
|---|---|---|---|
| 202918 | 3/1966 | Sweden | 176/37 |

*Primary Examiner*—S. A. Cangialosi
*Attorney, Agent, or Firm*—Haseltine, Lake & Waters

[57] ABSTRACT

In a nuclear reactor, a drainage channel for the safety injection and spray circuits of the reactor is arranged in the bottom of the annular gap between two substantially vertical walls surrounding the pressure vessel of the reactor, the drainage channel comprising filter panels disposed vertically along each side of a central horizontal solid lower panel at the bottom of the annular gap and between two lateral horizontal solid upper panels so as to bound a central channel having vertical lateral filter walls communicating with two lateral chambers which communicate by substantially horizontal passages with a central collecting chamber disposed below the central lower panel and having an outlet for connection to the main intake of the safety circuit.

2 Claims, 5 Drawing Figures

RECIRCULATING DRAINAGE CHANNEL FOR THE SAFETY CIRCUITS OF A NUCLEAR REACTOR

This invention relates to a recirculating drainage channel for the safety injection and spray circuits of a nuclear reactor, more particularly those for use as the safety devices of a pressurized water reactor.

A pressurized water reactor comprises one or more primary pressurized water circuits, the pressurized water being circulated in a closed circuit by a primary circuit pump between the reactor pressure vessel and a steam-producing exchanger. The primary water heats up in the pressure vessel in contact with the nuclear fuel and yields its heat in the exchanger to a seconary fluid which is vaporized and used conventionally in electricity-producing turbo alternators. The building housing the reactor is a sealed concrete confining enclosure having an internal lining acting as a sealing skin. Within this enclosure the reactor pressure vessel and the primary circuits are placed in a second concrete enclosure known as the missile barrier, there being an annular gap between the outside of the inner enclosure and the inside wall of the outer enclosure. The missile barrier protects equipment placed in the annular gap, and seals off the outer enclosure, with respect to the risk of objects being hurled from the reactor core or from the primary circuits.

Upon removal of its top cover, the top part of the pressure vessel communicates with the bottom of a large capacity reservoir known as the reactor swimming pool. The swimming pool is filled with water when the vessel is being recharged so that the fuel assemblies are removed from, introduced into, or changed round in the pressure vessel while protected by a large body of water. When the reactor is in operation, the swimming pool is empty and the water is stored in a storage reservoir.

Complete safety of the pressurized primary circuit of the reactor is essential for safe operation, because any rupture in the primary circuit would lead to a loss of primary coolant and to depressurization thereof, with the possible result of the reactor core ceasing to be immersed in the coolant, so that the core would very soon overheat and melt. Also, the escape of high-temperature pressurized fluid into the outer confining enclosure would lead to evaporation of such fluid and to pressurization of the enclosure, with a risk of the enclosure rupturing and ejecting radioactive products externally. The procedure for such an accident is therefore to start a safety injection in the core immediately so as to refill it with fluid and cool it. Also water is immediately sprayed into the reactor building so as to condense the vapor produced by depressurization of the primary fluid and to keep the enclosure wall cool enough for the enclosure to be able to continue to confine radioactive products within the reactor building.

Clearly, therefore, the operations of safety injection of fluid into the reactor core and safety spraying of the whole building are vital for security in the event of a primary circuit accident.

The procedure in such cases is to use, at least in an initial phase, the water stored in the storage reservoir for the swimming pool for cooling water circulation in the reactor core and for spraying water in the building. Consequently, the normal procedure in response to overpressure being detected in the enclosure simultaneously with a pressure drop of the primary fluid is to start up the spray pumps in the enclosure to spray water in the reactor building and to start up the safety injection pumps for circulating sufficient cooling water in the reactor pressure vessel despite the primary circuit leak. Of course, all these circuits are either duplicated or triplicated, depending on various design considerations, so as to be able to deal with any faults in any of the pumps or any other element of the safety circuits.

After a period of time, which varies with the size of the primary circuit rupture, the swimming pool reservoir will be empty, and the water then used for the safety injection and the spraying of the enclosure is the trickle water which will by then have collected at the bottom of the reactor building, more particularly in the annular gap between the confining enclosure and the anti-missile barrier. The intakes of the spraying and injection pumps are therefore changed over to intake from recirculating drainage channels so as to recirculate water collected at the bottom of the reactor building. This second phase of post-accident protection may last a very long time, depending upon the seriousness of the accident. Under present safety rules the recirculation circuits must be able to operate for e.g. 1 year with deliveries of the order of between 2,000 and 2,500 m$^3$/hour, depending on the kind of reactor. Clearly, therefore, from a safety view point very great importance attaches to the recirculating drainage channel, which must filter all the kinds of debris produced by the accident so as to pass only those compatible with the technology of the pumps, the spray nozzles and the fluid flow orifices in the core—i.e., which must provide relatively fine filtering. On the other hand, the filtration requirement may lead to clogging of the filter grids or lattices and therefore to uncertain operation of the safety circuits, with all the ensuing consequences for safety.

The drainage channel used in recirculation of the safety water injected into the pressure vessel and of the water used for spraying the building must therefore meet very stringent conditions of minimum clogging of its filter surfaces, and safety rules also call for low rates of fluid flow through the filter grids or meshes and for means to inhibit the formation of vortexes in the drainage channel intake line.

In conventional systems the drainage channel usually has an oblong section, the four surfaces of which have filter meshes or grids and which is disposed in the middle of the annular gap, with intake piping extending to it below the bottom of the annular gap and substantially at the center of the rectangle forming the base of the channel. Each side surface of the oblong has three consecutive degrees of filtration, for instance, a first stage of coarse filtration using ordinary rods, then a mesh with voids of the order of $10 \times 10$ mm, and finally a fine-meshed filter with voids of the order of $3 \times 3$ mm. In such an arrangement, the transverse mesh, which may make up 70% of the cross-section of the annular gap, has most of the flow incident on it at right-angles and it experiences considerable and preferential clogging, so that after some time it is likely to become completely clogged. The flow cross-section then left for the total flow is thus only 30% of the total cross-section of the annular gap, which results in considerable increases in flow velocities at the grids or meshes. This speed-up greatly favors clogging, yet clogging must be avoided to the utmost possible extent. Also, in a system of this kind, the intake flow is substantially vertical near the intake pipe, so that there is a risk of vortex formation which may considerably impair pump behaviour. Another disadvantage is that a drainage channel of this kind presents an obstacle in the middle of the circulation area in the annular gap, so that movement of people and equipment during general maintenance of the reactor building are difficult.

Proposals have been made of variants to this system, more particularly by having the drainage channel base formed with a number of receiving orifices communicating via a collector with the general drain line. In this case vertical fine meshes are provided around each discharge orifice. This suggestion may improve flow distribution but causes a considerable pressure drop, making it necessary for the pumps to be disposed even further below the bottom of the reactor building. Also, since the drainage channel experiences strong aspiration at the bottom and weak aspiration at the top, a particle may pass completely through a number of fine meshes, so that the risk of clogging increases. Near each discharge orifice the aspiration is still substantially vertical, with considerable risk of eddying. Also, the rear surfaces of the fine meshes are probably ineffective and very likely to become clogged.

According to the invention, there is provided a recirculating drainage channel for collecting fluid for recirculation in the safety injection and spray circuit of a nuclear reactor, said channel being located in an annular gap between two substantially vertical walls, said channel comprising filter panels disposed vertically along each side of a central horizontal solid lower panel at the bottom of the annular gap and between two lateral horizontal solid upper panels so as to bound a central channel having vertical lateral filter walls communicating with two lateral chambers which communicate by substantially horizontal passages with a central collecting chamber disposed below the central lower panel and having an outlet for connection to the main intake of the safety circuit.

Preferably, the cross-section of the central channel decreases in the direction of fluid flow.

The invention will be more clearly understood from the following description of an embodiment thereof, given by way of example only, with reference to the accompanying drawings.

In the drawings:

FIG. 1 is a view in diametric section through the reactor building;

FIG. 2 is a plan view in horizontal section;

Figure 1:
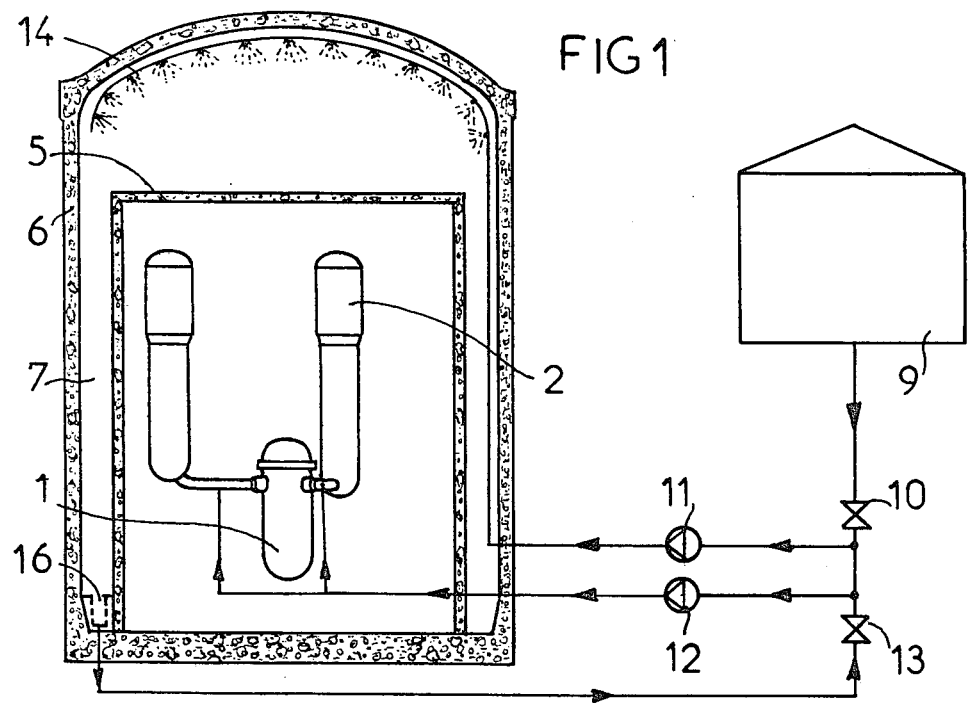
FIGS. 1 and 2 are very diagrammatic views of a safety injection and spraying circuit of a nuclear reactor using an embodiment of a drainage channel according to the invention.
Figure 2:
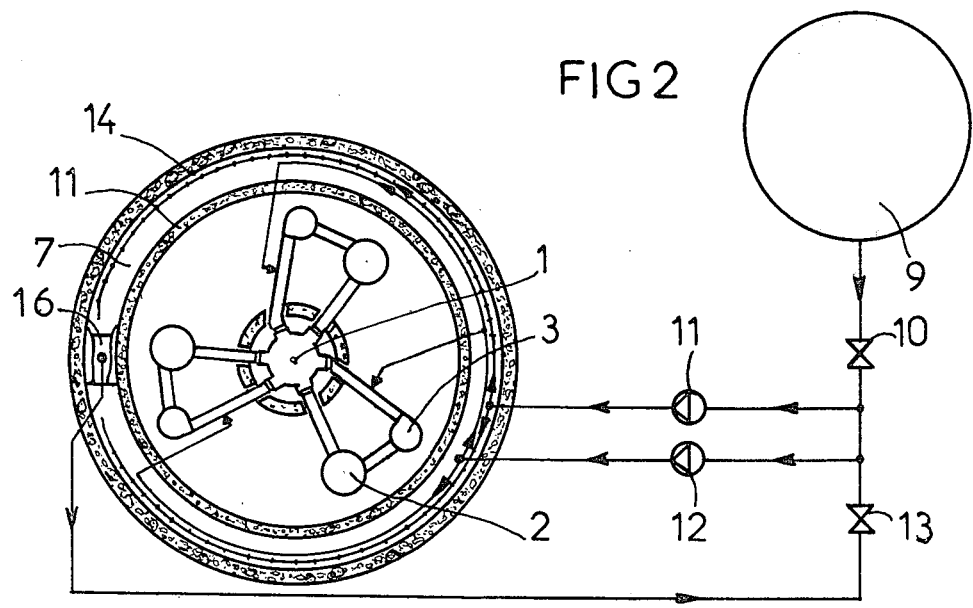

FIGS. 1 and 2 are simple sketches showing a central pressure vessel 1 of a reactor with, in this case, three primary circuits between the vessel 1 and exchangers 2, each circuit having a primary pump 3. The complete system formed by the pressure vessel 1 and the primary circuits is contained in a missile barrier 5 which is concentric with a bounding wall 6 of the reactor building, an annular gap 7 being left between the barrier 5 and the wall 6.

A reservoir 9 whose normal function is to store the water for a swimming pool (not shown) is connected by a diagrammatically illustrated valve 10 to two pumps 11, 12. The pump 11 delivers to spray banks or batteries 14 disposed in the reactor building and serving to spray water therein. The pump 12 delivers to a reinjection line connected to one of the elements of each primary circuit. Of course, the pump 12 and the circuits in which it is disposed are provided in duplicate or even triplicate, although this feature is not shown in these diagrammatic Figures. Similar considerations apply to the pump 11, and the spray banks likewise comprise a number of independent circuits in accordance with the basic design of safety circuits; the basic design may vary accordingly as the safety circuits concerned have two or more trains.

If an accident occurs in one of the reactor primary circuits, leading to a pressure rise in the reactor enclosure, safety detectors—which are not shown here because they are completely conventional—immediately start the pumps 11, 12 and open the valve 10, and the water in the reservoir 9 is injected into the defective primary circuit to maintain reactor core cooling while water is sprayed into the whole building to condense the steam and reduce the internal pressure. When all the water of the reservoir 9 has been used, trickle water will have collected in sufficient quantity in the gap 7 and the pumps 11, 12 are supplied on a recirculation basis with water from a drainage channel 16 after the valve 13 has been opened.

Figure 3:
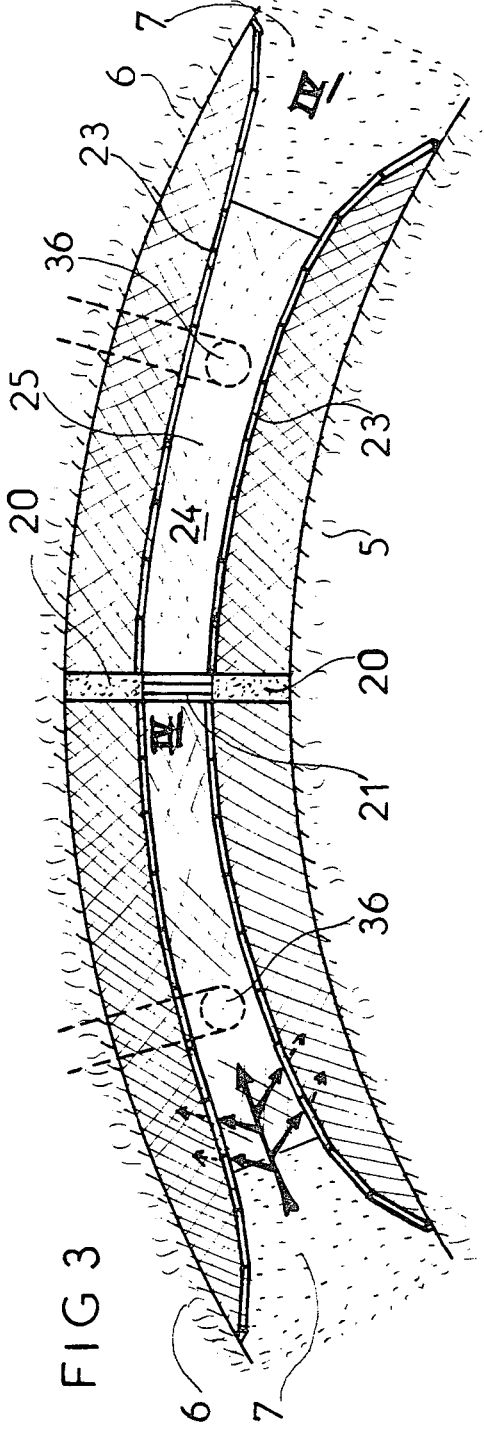
FIG. 3 is a plan view to an enlarged scale of an embodiment of a double draining channel in the annular gap between the confining or outer enclosure and the missile barrier of the nuclear reactor.
Figure 4:
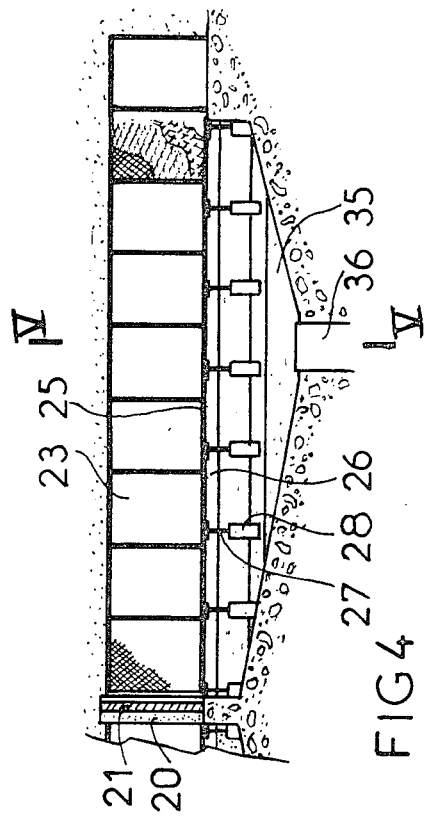
FIG. 4 is a developed view on the average radius of the annular gap of half of the double drainage channel of FIG. 3 and on the line IV—IV of FIG. 3.
Figure 5:
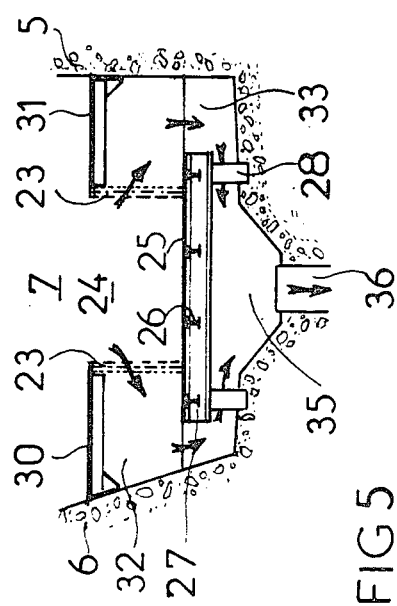
FIG. 5 is a section on the line V—V of FIG. 4.

The drainage channel 16 will now be described in greater detail with reference to FIGS. 3 to 5. The drainage channel to be described is in fact a double drainage channel whose two parts are disposed symmetrically one on each side of a separating wall 20 forming a transverse barrier or partition across the annular gap 7. The partition or wall 20 has an openable door or hatch or the like 21 in its central part.

Each discrete drainage channel comprises a number of vertical filter panels 23 each comprising three consecutive grids, lattices, meshes or the like whose flow orifices become increasingly narrow. The panels 23 form two vertical walls bounding a central channel 24 which narrows in the direction of flow of water, such direction being indicated by solid-line arrows in the Figures. The central channel 24 is bounded at the bottom by the concrete bottom of the annular gap 7 near its entry and, inwardly thereof, by a solid sheet metal member 25 which extends the bottom of the gap 7 at the same level and which is carried on a number of longitudinal and transverse beams 26, 27 resting on small concrete elements 28.

Solid lateral horizontal panels 30, 31 of sheet metal bound, adjacent the wall of the enclosures 6 and adjacent the missile barrier 5 respectively, two side chambers 32, 33 respectively. Below the metal panel 25 the bottom of the gap 7 is recessed to form a collecting chamber 35 to which a main intake line 36 of the recirculating circuit extends. At the bottom, the side chambers 32, 33 communicate with the chamber 35 by way of substantially horizontal passages between the elements 28.

In the drainage channel thus devised, the stream of fluid flowing in the annular gap 7 impinges on the panels 23 tangentially and the rate of flow of the fluid through the filter panels is completely independent of the tangential velocity of the fluid along the panels. The rate of flow through the panels can be found by determining their area in dependence upon the required flow rate and using a utilization factor, e.g. of 0.5, based on the assumption that half the panel is clogged. The tangential velocity of the fluid flow opposes clogging of the mesh. Also, there is a large flow cross-section between the side chambers 32, 33 and the central collecting chamber 35, so that there is no great speed-up near the inner surface of the filter panels. Also, the horizontal path followed by the fluid at the entry to the chamber 35 inhibits the formation of vortices.

To balance the rates of flow through the various filter panels 23, the panels are, in this embodiment, arranged so that the central channel 24 narrows from its full flow cross-section at its entry to a reduced cross-section at the partition 20. An alternative would be to provide substantially radial plates in the filter chambers 32, 33 for improved orientation of the stream lines therein.

The drainage channel thus devised does not interrupt the continuity of flow in the annular gap 7 but merely reduces its cross-section in the zone of the drainage channel while still remaining at the same level as the bottom of the gap 7.

The invention is not of course intended to be limited to the embodiments hereinbefore described by way of example only, but covers constructions differing therefrom only in details or in variants of execution or in the use of equivalent means. For example, the use of single or double or even triple drainage channels and the choice of their layout in the annular gap depends upon the overall design of the safety system, more particularly on the number of trains used for safety injection and spraying.

What is claimed is:

1. A recirculating drainage channel for collecting fluid for recirculation in the safety injection and spray circuit of a nuclear reactor, said channel being located in an annular gap between substantially vertical walls, wherein said fluid flows in a horizontal direction, said channel comprising:
   a central horizontal solid lower panel arranged at the bottom of said gap;
   a pair of lateral horizontal solid upper panels supported by the sides of the annular gap and arranged laterally of and above said central panel, said upper and lower horizontal panels being parallel to the direction of flow of the fluid;
   a plurality of adjacent filter panels extending vertically between said lateral upper panels and said central lower panel to define with said central lower panel a central chamber having vertical lateral filter walls,
   whereby said vertical walls, said upper horizontal panels said filter panels and the bottom of said gap define a pair of lateral chambers on opposite sides of said central channel each communicating with said central channel through respective filter walls;
   means defining a central collecting chamber beneath said central lower panel;
   substantially horizontal passage means communicating with a respective one of said lateral chambers and said central collecting chamber; and
   outlet means for said central collecting chamber and for connection to said safety circuit; and wherein said lateral filter walls approach each other so that the cross section of said central channel decreases in the direction of the flow of fluid therealong.

2. A double drainage channel comprising two drainage channels according to claim 1, said drainage channels being arranged one on each side of partition means comprising a part for separating corresponding lateral chambers of said drainage channels and an openable part for separating said central channels thereof, the drainage channels being arranged with the smaller cross-section ends of the central channels adjacent said partition means.

* * * * *

UNITED STATES PATENT AND TRADEMARK OFFICE
CERTIFICATE OF CORRECTION

PATENT NO. : 4,243,485
DATED     : January 6, 1981
INVENTOR(S) : MICHEL CHABIN

It is certified that error appears in the above-identified patent and that said Letters Patent are hereby corrected as shown below:

In the Heading insert:

[30]   Foreign Application Priority Data

March 16, 1977    France    77-07788

Signed and Sealed this

Twenty-eighth Day of April 1981

[SEAL]

*Attest:*

RENE D. TEGTMEYER

*Attesting Officer*    *Acting Commissioner of Patents and Trademarks*